United States Patent [19]

Appleby et al.

[11] Patent Number: 4,872,366

[45] Date of Patent: Oct. 10, 1989

[54] HOOD RELEASE ASSEMBLY WITH INTEGRAL SNAP IN RETENTION AT INSTRUMENT PANEL

[75] Inventors: John M. Appleby, Warren; James Bolsworth, Sterling Heights; Charles M. Wilson, Westland, all of Mich.

[73] Assignee: General Motors Corporation, Detroit, Mich.

[21] Appl. No.: 237,480

[22] Filed: Aug. 29, 1988

[51] Int. Cl.⁴ .............................. F16C 1/10; E05B 3/00
[52] U.S. Cl. .................................... 74/501.6; 74/500.5; 74/502.4; 292/DIG. 25; 292/DIG. 31
[58] Field of Search ................. 74/501.6, 500.5, 502.4, 74/502.6, 502.5; 296/70; 180/90; 292/DIG. 25, DIG. 31, 336.3, DIG. 38; 70/256, 208, 241

[56] References Cited

U.S. PATENT DOCUMENTS

| | | | |
|---|---|---|---|
| 3,795,416 | 3/1974 | Hehl | 292/336.3 |
| 3,850,464 | 11/1974 | Bisbing | 292/DIG. 38 |
| 3,955,441 | 5/1976 | Johnson | 74/502.4 |
| 4,038,718 | 8/1977 | Reilhac | 292/336.3 |
| 4,343,501 | 8/1982 | Meeks | 292/336.3 |
| 4,478,441 | 10/1984 | Fiordellisi | 292/336.3 |
| 4,497,514 | 2/1985 | Moriya | 292/336.3 |
| 4,580,822 | 4/1986 | Fukumoto | 292/DIG. 13 |

FOREIGN PATENT DOCUMENTS

| | | | |
|---|---|---|---|
| 2140589 | 2/1973 | Fed. Rep. of Germany ... | 292/336.3 |
| 2329676 | 12/1974 | Fed. Rep. of Germany ........ | 180/90 |

*Primary Examiner*—Gary L. Smith
*Assistant Examiner*—Flemming Saether
*Attorney, Agent, or Firm*—William A. Schuetz

[57] ABSTRACT

A hood release assembly which can be snap fittingly attached to an instrument panel having a rectangular opening. The assembly includes a plastic housing having one end slidably connected to the panel via a tongue and groove connection and its opposite end snap fittingly attached to the panel via an integral fastener on the housing, a cable release lever having integral pivot pins which are snap fittingly received within complementary shaped openings in the housing and a rear cover which is integrally connected to the housing via a living hinge at one end and releasably detentable with the housing at its other end to permit access to the housing from the rear thereof.

5 Claims, 2 Drawing Sheets

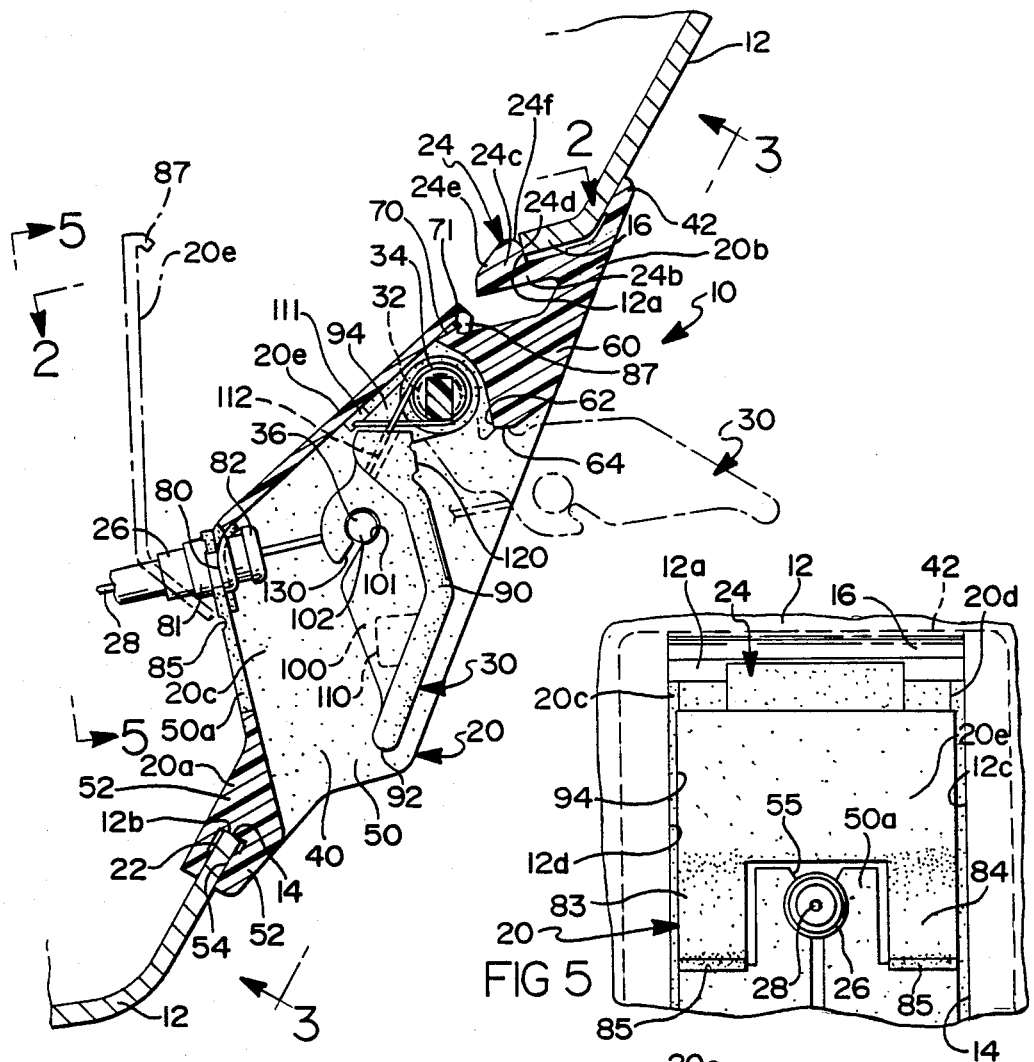
FIG 1
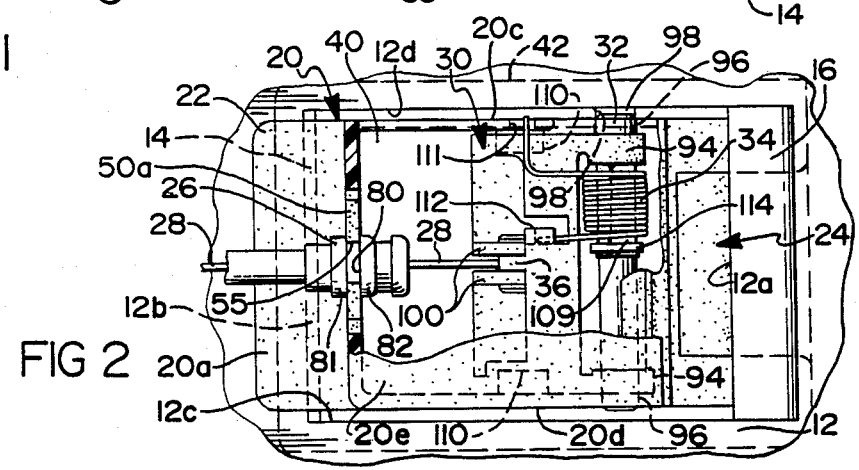
FIG 5
FIG 2

HOOD RELEASE ASSEMBLY WITH INTEGRAL SNAP IN RETENTION AT INSTRUMENT PANEL

The present invention relates to a hood release assembly for an automotive vehicle and, more particularly, to a hood release assembly which can be readily snap fittingly attached to and detached from a panel, such as an instrument panel, of an automotive vehicle without any need for separate fasteners.

It is common to provide hood release assemblies in automotive vehicles which are mounted on an instrument panel or dashboard and located adjacent the driver side of the vehicle. Known such assemblies often include a housing provided with an open recess in which a manually manipulatable member or lever is movably connected to the housing and located therein so that it is either flush with or recessed within the instrument panel. The lever is connected to one end of a cable, the other end of which is connected to a releasable latch lever of a hood latch assembly. Manually pulling or pivoting the lever causes the cable to be pulled, which in turn pivots the latch lever of the hood latch assembly, to release the hood so that it can be moved to an open position. These known assemblies, however, have used conventional, separate fasteners, such as screws, to unite different components thereof together and to attach the entire assembly to the instrument panel or dashboard.

In accordance with the provisions of the present invention, a novel hood release assembly is provided which includes a housing which can be readily snap fittingly attached to a panel, such as the instrument panel or dashboard, of an automotive vehicle in a manner such that no separate fasteners are required to retain the same on the panel. In another provision of the present invention, the movable release member or lever connected to the cable can be readily snap fitted attached to the housing without separate fasteners or retainers. A further provision is that the housing of the hood release assembly includes an integrally hinged rear cover which is snap fittingly retained in a closed position on the housing but which can be opened to permit ready access to the housing from the rear.

The above-noted provisions or features of the present invention are achieved, in the preferred embodiment of the present invention, by providing the panel, such as the instrument panel or dashboard, of the vehicle with a through opening whose periphery is defined by upper, lower and side edge portions of the panel, a hood release cable which is adapted to be connected with a hood release latch assembly and a hood release assembly which is disposed within the opening in the panel and is snap fittingly attached thereto. The hood release assembly comprises a one piece plastic housing having upper and lower portions, side wall portions and a rear wall portion which together define a recess open toward the passenger compartment and with the upper end portion of the housing including a flange for snap fittingly engaging the panel when attached thereto, a manipulatable hood release member disposed within the recess of the housing and operatively connected with one end of the cable and with the release member being supported by the housing for movement between a first position in which the release member is disposed within the recess and the cable is relaxed and a second position in which it is moved inwardly toward the passenger compartment of the vehicle to pull on the cable to release the hood latch and a spring means for biasing the hood release member towards its first position. The housing at its lower end portion is provided with a slot for slidably receiving the lower edge portion of the panel and the upper end portion of the housing has an integrally formed, cantilever snap fastener which extends in a rearward direction away from passenger compartment and which snap fittingly engages the upper edge portion of the panel when attached thereto. The snap fastener comprises a deflectable shank integral with the upper end portion of the housing and a barb integral with the shank at its end remote from the upper end portion of the housing. The hood release assembly is attached to the panel by sliding the lower end portion of the housing over the lower edge portion of the panel and then moving the upper end portion of the housing toward the panel and with the barb engaging the upper edge portion to cause the fastener to be deflected away from its normal free state position until the barb clears the upper edge portion whereupon the fastener returns towards its normal free state position to lock behind the upper edge portion of the panel and with a peripheral flange on the upper edge portion of the housing engaging the panel on the side facing the passenger compartment whereby the hood release assembly is readily snap fittingly attached to the panel without the need for any separate fasteners.

In accordance with another provision of the present invention, the release member of the hood release assembly comprises a lever having a pair of pivot pins extending laterally of its sides which are snap fittingly received within openings on adjacently located sides of the housing so as to pivotally retain the lever within the housing without the need for separate fasteners.

Yet another provision of the present invention is to form the rear wall portion of the housing as a cover which is integrally hinged with the remainder of the housing and which is normally biased toward an open position in which access into the recess of the housing from the rear is permitted, but which can be flexed about the integral hinge to cover the rear portion of the housing, the cover and the housing having cooperable detent means for holding the cover in closed position when moved thereto.

The present invention further resides in various novel constructions and arrangement of parts, and further provisions, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 1 is a cross sectional view, with parts shown in elevation, of a preferred embodiment of the novel hood release assembly of the present invention and showing the same connected to an instrument panel or dashboard of vehicle;

FIG. 2 is a top plan view, with portions broken away, of the hood release assembly shown in FIG. 1 and looking in the direction of the arrows 2—2 thereof;

FIG. 5 is a fragmentary rear elevational view of the hood release assembly shown in FIG. 1 and looking in the direction of the arrows 5—5 thereof.

Figure 4:
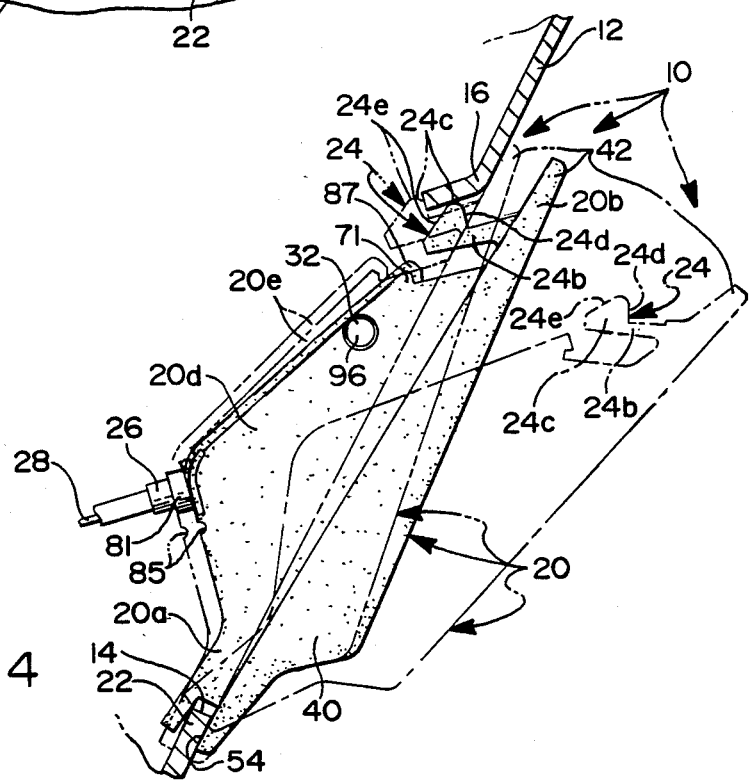
FIG. 4 is a view like that shown in FIG. 1, but showing t release assembly in side elevation and showing the manner in which it is connected to the instrument panel or dashboard.

The present invention provides a novel hood release assembly 10 which can be readily snap fittingly attached to a panel 12, preferably the instrument panel or dashboard, of an automotive vehicle (not shown). The panel 12 would be provided with a generally rectangularly shaped through opening 14 whose periphery would be defined by upper, lower and side edge portions 12a, 12b and 12c, 12d of the panel. The upper edge of the panel 12a of the panel 12 defining the opening 14 is at the end of an inwardly inclined bent lip 16, as best shown in FIGS. 1 and 4. The lip 16 is bent inwardly away from the passenger compartment of the vehicle and would be inclined downwardly toward the lower edge 12b of the panel 12, and for a reason to be hereinafter more fully described.

The hood release assembly 10 is disposed within the opening 14 in the panel 12 and attached thereto. The hood release assembly 10 comprises, in general, a one piece plastic housing 20 having a lower end portion 20a which is slidably connected to the panel 12 via a tongue and groove type connection 22 and having an upper end portion 20b which is snap fittingly retained against the panel 12 via an integral fastener 24, a cable guide member 26 which is connected to and supported by the housing 20, a hood release cable 28 slidably received within the cable guide 26 and having one end which is adapted to be collected with a hood release lever of a hood latch assembly, a manually manipulatable release lever 30 which is pivotally connected to the housing 20 via a pivot means 32, and a torsion spring 34 having one end connected with the housing 20 and its other end connected with the lever 30 for biasing the pivotal lever towards its solid line position, as shown in FIG. 1 in which it is wholly disposed within the housing 20. The lever is operatively connected with the cable 28 at its end remote from the hood latch assembly via a connector means 36.

The lever 30 is adapted to be manually manipulated from its solid line position shown in FIG. 1 in which the cable 28 is relaxed and the hood latch assembly (not shown) latches a hood (not shown) to the body structure of the vehicle (not shown) and a release position, as shown, by the phantom lines in FIG. 1, in which the release lever 30 is moved in opposition to the biasing force of the torsion spring 34 and pulls the cable 28 taut and inwardly into the housing 20 to cause a latch lever (not shown) of the hood latch assembly to be released so as to enable the hood of the vehicle to be moved to an open position. When the lever 30 is released from the phantom position shown in FIG. 1, it is returned towards its solid line position by the torsion spring 34.

The one piece plastic housing 20 is generally rectangular in shape and comprises the upper portion 20b, the lower portion 20a, side wall portions 20c and 20d and a rear wall portion 20e which together define a recess 40 open towards the passenger compartment of the vehicle. In addition, the housing 20 at its front side facing the passenger compartment of the vehicle includes an integral peripherally extending flange 42 which engages the panel 12 adjacent its sides defining the opening 14.

As best shown in FIGS. 1 and 4, the lower portion 20a of the housing includes a thin wall section 50 and a thickened section 52 having a transversely extending slot or groove 54 therein which slidably receives the lower edge portion 12b of the panel 12 to form or provide the tongue in groove connection 22 therebetween. The thin wall section 50 extends laterally across the bottom and includes an upwardly extending intermediate portion 50a having a tapered slot 55 therethrough. Although the section 50 is relatively thin when compared to the section 52, it is nevertheless substantially rigid.

The side wall portions 20c and 20d of the housing 20 are relatively thin, but substantially rigid, the transverse distance between the side wall portions 20c and 20d (exterior side to exterior side) is slightly less than the width between the side edge portions 12c and 12d of the panel so that the housing 20 can be easily moved through the opening 14 in the panel 12.

The upper portion 20b of the housing 20 includes a lower or inner thickened section 60 which is molded or formed so as to have an arcuate interior surface 62 and a generally horizontal abutment surface 64 facing toward the recess 40, and for a reason to be hereinafter more fully described. The lower section 60 of the upper portion 20 of the housing 20 also includes a rearwardly projecting lip 70 provided with a transversely or outwardly extending nib 71, and for a reason to be hereinafter more fully described.

The upper housing portion 20b of the housing 20 intermediate its outer peripheral flange 42 and the lower section 60 is formed so as to have the fastener 24 integral therewith. The fastener 24 extends rearwardly of the passenger compartment and rearwardly into the opening 14 defined in the panel 12 and is supported in cantilever fashion on the upper housing portion 20b. The fastener 24 has a deflectable shank portion 24b integral with the upper housing portion 20b at one end and integral with a head or barb 24c at its other end. The barb 24c has a planar surface 24d adjacent the shank 24b and has a tapered entry surface 24e and a rounded surface 24f bridging the tapered entry surface 24e in the transverse planar surface 24d. The fastener 24 has a normal free state position, as shown in FIGS. 1 and 4, but it is deflectable by bending about the shank portion 24b. The self biasing forces of the plastic material used to form the housing 20 is such that the fastener 24 is self biased towards its normal free state position, as shown in FIGS. 1 and 4.

The thin wall section 50 of the lower portion 20a of the housing 20 supports the cable guide or guide means 26. The cable guide 26 comprises an annular member made of a suitable plastic material having an annular groove 80 therein to define a pair of spaced flanges 81 and 82. By sliding the cable guide 26 over one end of the cable 28 and then force fitting the cable guide 26 within the tapered slot 55 so that the flanges 81 and 82 are disposed on opposite sides of the upwardly extending portion 50 enables the cable guide 26 to be readily fixed to the lower portion 20a of the housing 20 and t be supported thereby.

The rearward wall portion 20e of the housing 20 is thin walled and comprises a cover. The cover or rear wall portion 20e is generally of an inverted U-shape as shown in FIG. 5 and with its legs 83 and 84 being integrally hinged to the section 50 of the lower portion 20a of the housing 20 via integrally formed living hinges 85. The living hinges 85 are located below the slot 55 in the section 50 in the lower portion 20a of the housing 20, as shown in FIG. 5. The housing 20 in the as-molded condition has the cover 20e molded in an open position, as shown by the phantom lines in FIG. 1 of the drawings. This is the normal free state position of the cover 20e and with the hinges 85 functioning to self bias the cover 20e toward this position. When the cover 20e is in the phantom line position shown in FIG. 1, access to the recess 40 in the housing from the rear side of the housing 20 can be had.

The cover 20e is adapted to be bent or flexed about its hinges 85 from its normal open position, as shown by the phantom lines in FIG. 1, towards its closed position, as shown by the solid lines in FIG. 1. In the closed position, the cover 20e overlies the rear of the housing 20, as best shown in FIGS. 1 and 5. The cover 20e at its free end is provided with a detent or nib 87 which is cooperably engageable with the nib 71 on the upper portion 20b of the housing so as to snap fittingly detent the same in this position. The cover 20 can be undetented and moved toward its open position, as shown by the phantom lines in FIG. 1, by pressing down on the cover 20e and moving it upwardly, as viewed in FIG. 1 to undetent the nib 87 from the nib 71. When undetented, the self-biasing forces of the hinges 85 will automatically move the cover 20e to its open position, as shown by the phantom lines in FIG. 1.

The housing 20 pivotally supports the lever 30 for movement between a hood latch position, as shown by the solid lines in FIG. 1, and a hood release position, as shown by the phantom lines in FIG. 1, via the pivot pin means 32. The lever 30 extends substantially across the recess 40 formed in the housing 20 and comprises a main body portion 90 extending laterally across the recess 40, a lower finger grasping end portion 92 and an upper portion comprising a pair of upwardly extending ears or bosses 94 located at spaced lateral locations. Integrally formed with the bosses 94 and extending laterally outward therefrom toward the side walls 20c and 20d of the housing 20 are pivot pins 96. The pins 96 are adapted to be snap fittingly connected to the side walls 20c and 20d of the housing 20 by being forced into the housing 20 and with the pins being received within openings or depressions 98 in the side walls 20c and 20d in the housing. Preferably, the lever 30 would be connected to the side walls 20c and 20d of the housing 20 right after the molding operation for the housing 20 and while the housing 20 is still warm so that the lever 30 can be force fitted between the side walls 20c and 20d until the pivot pins 96 are in registry with the openings 98 whereupon the side walls will return to their normal position and with the pins being received within the openings 98. When the housing is allowed to cool down the side walls 20c and 20d become more rigid and such that a good pivotal connection is made between the lever 30 and the pivot pins 96 formed integral with the bosses 94 thereof. Thus, the lever 30 can be pivotally connected to the housing 20 without the need of any separate fasteners or retainers.

The lever 30 is also adapted to be connected to one end of the cable 28, i.e., the end of the cable disposed within the recess 40 of the housing 20 by the connector means 36. To this end, the lever 30 is provided with a pair of rearwardly extending spaced flanges or ribs 100 having aligned openings 101 therethrough. The openings 101 are adapted to force fittingly receive a pivot pin 102 of the connector means 36 to which one end of the cable 28 is connected, the pivot pin 102 being suitably retained within the openings 101 against axial movement by the cable 28, which extends between the ribs 102.

Figure 3:
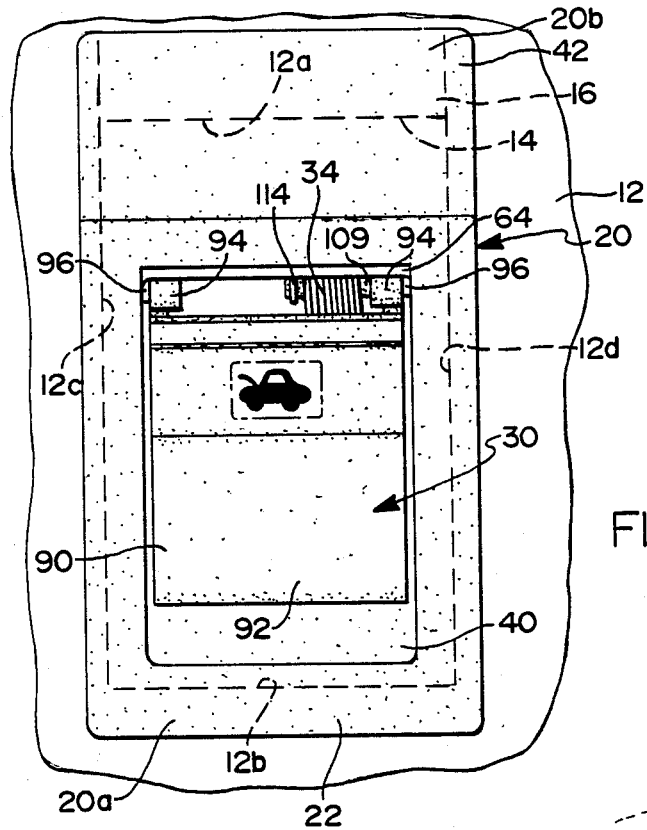
FIG. 3 is a front elevational view of the hood release assembly shown in FIG. 1 and looking in the direction of the arrows 3—3 thereof.

The lever 30 is biased towards its cable release position, as shown by the solid lines in FIG. 1, and held against suitable stops or abutments 110 formed integral with the side walls 20c and 20d of the housing 20 by the torsion spring means 34. The torsion spring means 34 comprises a coiled torsion spring which is slidably disposed on a pin 109 formed integral with the rightmost boss 94, as viewed in FIG. 3, of the lever 30. The torsion spring has one end thereof bent and suitably received through a slot 111 in the side wall 20c of the housing and has its other end within a slot in a boss 112 formed integral with the lever 30, as best shown in FIG. 1. The torsion spring 34 is retained on the pin 109 via a suitable retaining ring or clip 114.

The manner in which the hood release assembly 10 is installed on the instrument panel 12 of the vehicle will now be described. As noted below, the hood release lever 30 is preferably pivotally attached to the housing 20 right after the molding operation to form the housing 20. When the housing 20 is still warm from the molding operation, the lever 30 can be positioned within the recess 40 and the side walls 20c and 20d deflected upon engaging the pivot pins 96 until the pivot pins are aligned with the openings 98 in the side walls 20c and 20d thereof. When this occurs, the side walls 20c and 20d will return to their normal molded position due to the self biasing force of the plastic material so that the pivot pins 96 are received within the openings 98 to provide a good pivotal connection between the lever 30 and the housing 20.

Thereafter, the housing and lever subassembly can be attached to the instrument panel 12. This is accomplished, as best shown in FIG. 4, by moving the assembly 10 adjacent the opening 14 in the instrument panel 12 and slidably moving the lower end portion 20a of the housing 20 over the lower edge 12b of the panel 12. When the panel 12 is fully slidably received within the groove 54 in the lower portion of the housing 20, a tongue and groove connection 22 therebetween is established. The remainder of the housing 20 can then be moved toward the instrument panel 12. As the housing 20 is moved toward the instrument panel 12, the tapered and rounded surfaces 24e and 24f of the barb 24c of the fastener 24 will engage the inclined lip 16 of the instrument panel 12. This causes the fastener 24 to be deflected downwardly, as viewed in FIGS. 1 and 4, until the barb 24c clears the inner edge 12a of the lip 16 whereupon the fastener 24 due to its inherent self biasing forces will return toward its normal free state position in which it hooks or its surface 24d is disposed behind the edge 12a on the lip 16 of the panel 12. In this position, the outer flange or escutcheon 42 will be engaged against the outside of the panel 12 and the entire assembly will be securely retained on the instrument panel 12 via a snap fit.

After the housing 20 is attached to the instrument panel 12, the operator can then assemble the torsion spring to the pin 110 and hook the ends within the slot 111 in the side wall 20 of the housing and the other end within the slot in the boss 112 of the lever 30. This will cause the lever 30 to be biased towards its solid line position shown in FIG. 1, in which it engages the stops 110 on the housing 20. Also in this position, the operator can position the cable guide 26 over the end of the cable 28 and attach the cable to the bottom wall 50 of the housing 20 in a manner hereinbefore described. The operator at that time can also attach the end of the cable 28 to the pin 102 and connect the pin 102 to the lever 30 by forcing the same through slots 130 in the ribs 100 until the pin 102 is received within the openings 101. Thereafter, the operator can move the cover 20e from its normal open position, as shown by the phantom lines in FIG. 1, to its closed position, as shown by the solid lines in FIG. 1, in which the nibs 87 and 71 cooperate with each other to secure or detent the cover 20e in place.

Of course, it will be understood, that one or more of these latter subassemblies could take place prior to attaching the housing 20 to the panel 12, if desired.

In operation, and with the cable 28 being connected with a pivotal latch lever of the hood latch assembly (not shown), the operator can release the hood latch lever (not shown) by merely grasping the lower end 92 of the lever 30 and pull the same upwardly from its solid position towards its phantom line position, as shown in FIG. 1. This pulls the cable 28 taut and pulls the cable 28 inwardly of the recess 40 in the housing 20 to cause the hood latch lever (not shown) to be unlatched to release the hood for movement towards its open position. Upon release of the lever 30, the torsion spring 34 will return the lever from its phantom line position, as shown in FIG. 1, to its full line position, as shown in FIG. 1, until the lever 30 engages the abutment stops 110. In the full line position of the lever 30, the lever is wholly disposed within the recess 40 of the housing 20 and is substantially flush with the front side of the housing 20 facing the passenger compartment of the vehicle.

It should be noted that the lever 30 includes a stop 120 on its main body portion 90 which is engageable with the stop 64 on the housing 20 to limit the extent to which the lever 30 can be moved towards its release position.

It should also be apparent that the provision of the integrally hinged cover 20e provides for easy service of the hood release assembly 10 should service be required. By merely pressing down and moving the cover fall upwardly slightly, the cover 20e can be released and will self return towards its normal free state position, as shown by the phantom lines in FIG. 1. In this position, access from the rear of the hood latch assembly 20 is permitted to enable the fastener 24 to be deflected downwardly to release the housing 20 to enable it to be disconnected from the panel 12 so that the torsion spring 34, connection means 36, cable guide 26, etc. to be disconnected and/or serviced.

From the foregoing, it should be apparent that a novel hood release assembly has been provided which can be readily attached to and detached from an instrument panel 12 of an automotive vehicle and which does not require the use or need for any separate fasteners to attach the housing to the instrument panel or to attach the hood release lever to the housing.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In combination, a passenger compartment panel for an automotive vehicle, such as an instrument panel, having an opening therethrough Whose periphery is defined by upper, lower and side edge portions of said panel, a hood release cable which is adapted to be connected with a hood release latch assembly and a hood release assembly disposed within said opening and attached to said panel, said hood release assembly comprising a one piece housing having upper and lower end portions, side wall portions and a rear wall portion which together define a recess open toward the passenger compartment, said upper end portion including a flange for engaging said panel when attached thereto, a manually manipulatable hood release lever disposed within said recess of said housing and operatively connected with one end of said cable at its end remote from the hood latch assembly, pivot means for pivotally supporting said release lever in said housing for movement about an axis between a first position in which the release member is disposed within said recess and the cable is relaxed and a second position in which the cable is pulled inwardly toward the passenger compartment, and spring means for biasing said hood release lever toward its first position, the improvement being that said lower end portion of said housing has a slot therein for slidably receiving said lower edge portion of said panel and that said upper end portion of said housing an an integrally formed, cantilever snap fastener which extends in a rearward direction away from the passenger compartment and which snap fittingly engages said upper edge portion of said panel when attached thereto, said fastener having a deflectable shank integral with said upper end portion of said housing and a barb integral with said shank at its end remote from said upper end portion of said housing, said hood release assembly being attachable to said panel by sliding said lower end portion of said housing over said lower edge portion of said panel and then moving said upper end portion of said housing toward said panel and with said barb engaging said upper edge portion of said panel to cause said fastener to be deflected away from its normal free state position until said bar clears said upper edge portion whereupon said fastener returns toward its normal free state position to lock behind said upper edge portion and with the flange on said upper end portion of said housing engaging said panel at its side facing the passenger compartment whereby said hood release assembly is attached to said panel without any need for separate fasteners, said pivot means comprising aligned integral pivot pin ends extending laterally from opposite sides of said release lever, said side wall portions of said housing having aligned openings therein, said pivot pin ends being snap fittingly connected to said side wall portions by being forced into said housing until the pivot pin ends are received without said openings in said side wall portions, and said rear wall portion of said housing comprises a cover integrally hinged to said bottom portion of said housing via a living hinge means, said living hinge means biasing said cover to an open position to permit access from the rear of said housing to said recess, said cover being movable to a closed position in opposition to the biasing force of said living hinge means in which it overlies said side portions of said housing and cooperable detent means on said cover and said upper portion of said housing for snap fittingly retaining said cover in its closed position, said cover being movable to its open position in response to undetenting said detent means.

2. In combination, as defined in claim 1, and wherein said upper edge portion of said panel is located at the end of an inclined lip on said panel, and wherein said barb of said fastener engages said inclined lip on said panel as said hood release assembly is being attached to said panel to cause the fastener to be deflected until said barb clears said upper edge portion.

3. In combination, as defined in claim 2, and wherein said bottom portion of said housing has a slot and said cable is slidably within a cable guide means straddling said slot and connected to said bottom portion of said housing to guide movement of the cable into and out of said recess in said housing, and wherein said cover has an inverted U-shape to define spaced legs which are integrally connected to said bottom of said housing by said living hinge means, said cover straddling said bottom adjacent its location defining said slot for said cable guide means, said cover overlying the cable guide means when in its closed position, but not overlying said cable guide means when in its opening position to permit the cable guide means to be attached and detached from said bottom of said housing.

4. In combination, as defined in claim 3, and wherein said spring means is a torsion spring surrounding a shaft formed integral with said release lever, said torsion spring having one end secured to said release lever and its other end secured to said housing.

5. In combination, as defined in claim 1, and wherein said detent means is undetented by pressing said cover against said side wall portions to cause the detent means on said cover to disengage the detent means on said upper portion of the housing.

* * * * *